United States Patent [19]

Shiga et al.

[11] Patent Number: 5,282,705
[45] Date of Patent: Feb. 1, 1994

[54] BURNISHING DRILL

[75] Inventors: Kiyotaka Shiga; Akio Fukui; Masaki Yasuhara; Tsunehisa Yamashita; Manabu Shimizu, all of Toyota, Japan

[73] Assignee: Fuji Seiko Corporation, Toyota, Japan

[21] Appl. No.: 969,077

[22] Filed: Oct. 30, 1992

[30] Foreign Application Priority Data

Jul. 28, 1992 [JP] Japan .................................. 4-201034

[51] Int. Cl.⁵ .............................................. B23B 51/02
[52] U.S. Cl. .................................. 408/211; 408/224; 408/229
[58] Field of Search ............... 408/211, 223, 224, 227, 408/229, 230

[56] References Cited

U.S. PATENT DOCUMENTS

| | | | |
|---|---|---|---|
| 3,977,807 | 8/1976 | Siddall | 408/223 |
| 4,605,347 | 8/1986 | Jodock et al. | 408/224 |
| 4,936,721 | 6/1990 | Meyer | 408/224 |
| 4,944,640 | 7/1990 | Suzuki et al. | 408/211 |
| 5,071,294 | 12/1991 | Suzuki et al. | 408/145 |
| 5,112,167 | 5/1992 | Shiga et al. | 408/211 |

FOREIGN PATENT DOCUMENTS

| | | |
|---|---|---|
| 7708833 | 6/1977 | Fed. Rep. of Germany . |
| 3923754 | 7/1990 | Fed. Rep. of Germany . |
| 3930936 | 7/1990 | Fed. Rep. of Germany .......... B23B 51/08 |
| 0278711 | 11/1988 | Japan .................... 408/229 |
| 9014189 | 11/1990 | PCT Int'l Appl. .................. 408/230 |
| 518345 | 12/1974 | U.S.S.R. . |
| 1238905 | 6/1986 | U.S.S.R. ............................. 408/230 |

OTHER PUBLICATIONS

Patent Abstracts of Japan, vol. 10, No. 151 (M-483) May 1986 re JP-A 61-4612.
Patent Abstracts of Japan, vol. 5, No. 187 (M-98) Nov. 1981 re JP-A 55-9677.
Catalogue of Sugino Machine Ltd., Japan, 1975.
Patent Abstracts of Japan, vol. 8, No. 152 (M-309) Jul. 14, 1984 re JP 59-47119 (A).

*Primary Examiner*—Mark Rosenbaum
*Assistant Examiner*—John M. Husar
*Attorney, Agent, or Firm*—Cushman Darby & Cushman

[57] ABSTRACT

A burnishing drill includes a cylindrical shank and a drill body connected to the shank. Drilling edges, reaming faces and reaming edges are formed on a first reduced-diameter portion, a second reduced-diameter portion and a third reduced-diameter portion located at a foremost end of the drill body respectively. The reaming faces which are located axially at backward positions of the drilling edges and the reaming edges extend radially outward from the foremost end of the drill and incline axially in the rearward direction, and also extend radially outward and incline in the rearward direction with respect of the rotational direction. Since an inner surface of the hole drilled and reamed by the drilling edges and the reaming edges can be further smoothed by the reaming faces, the surface roughness of the finished hole can be much improved.

18 Claims, 18 Drawing Sheets

First Embodiment

Second Embodiment

BURNISHING DRILL

BACKGROUND OF THE INVENTION

The present invention relates to a burnishing drill providing both drilling and reaming functions.

There are known various types of burnishing drills including drilling edges and reaming edges, that are adapted to form a hole in a workpiece made of a material such as cast iron. The workpiece is first drilled by the drilling edges which are made of hard metal. The drilled hole is further worked by the reaming edges which have an external diameter that is slightly larger than that of the drilling edges, to provide a relatively smooth inner wall of the finished hole.

Since such burnishing drills generally have the linear reaming edges which extend radially outward from a foremost end of the drill and incline axially in a rearward direction, much burden is often applied to the reaming edges while cutting and this results in the lowering of the centering and stabilizing properties of the drill. Therefore, when the rotational center of the reaming edges deflects, the reaming edges can not finish the inner surface smoothly. Especially when the burnishing drills cut a relatively hard workpiece at relatively high feeding and rotating speeds, they tend to provide a finished hole with rough inner face.

SUMMARY OF THE INVENTION

An object of this invention is to solve such problems by the provision of a burnishing drill which is capable of forming an accurately and smoothly finished hole, thereby improving the centering and stabilizing properties.

To this end, the present invention provides a burnishing drill comprising a shank and a drill body connected at one end with said shank. A pair of drilling edges are formed at one end of the drill body extend radially outward from a foremost end of the drill and incline axially in a rearward direction with a predetermined cutting angle. A pair of reaming faces are formed axially at backward positions of the drilling edges have a maximum external diameter larger than the maximum external diameter of the drilling edges. The reaming faces extend radially outward from the foremost end of the drill body and incline axially in the rearward direction, and also extend radially outward and incline in the rearward direction with respect to the rotational direction. The burnishing drill may include a pair of forward outlines of the reaming faces with respect to the rotational direction which are formed circumferentially offset relative to the drilling edges by a predetermined angle.

With the burnishing drill of the first embodiment of the invention, a workpiece is drilled by the drilling edges, and the drilled hole is further burnished by the reaming faces to provide a smooth inner wall. Since the reaming faces can smooth the fine roughness on the inner surface of the drilled hole and reduce the amount of oversize of the hole diameter, the burnishing drill can improve the cutting stability when forming a hole and provide an accurately finished hole.

With the burnishing drill of the second embodiment of the invention, a workpiece is drilled by the drilling edges. The drilled hole is further worked by the reaming edges and burnished by the reaming faces to provide a smoother inner wall. Therefore, the burnishing drill can much improve the cutting stability and provide a more accurately finished hole.

BRIEF DESCRIPTION OF THE DRAWINGS

Embodiments of the invention will now be described, with reference to the accompanying drawings, in which.

DETAILED DESCRIPTION OF PREFERRED EMBODIMENTS OF THE INVENTION

The first embodiment of the invention is illustrated in FIGS. 1 to 7.

Figure 1:
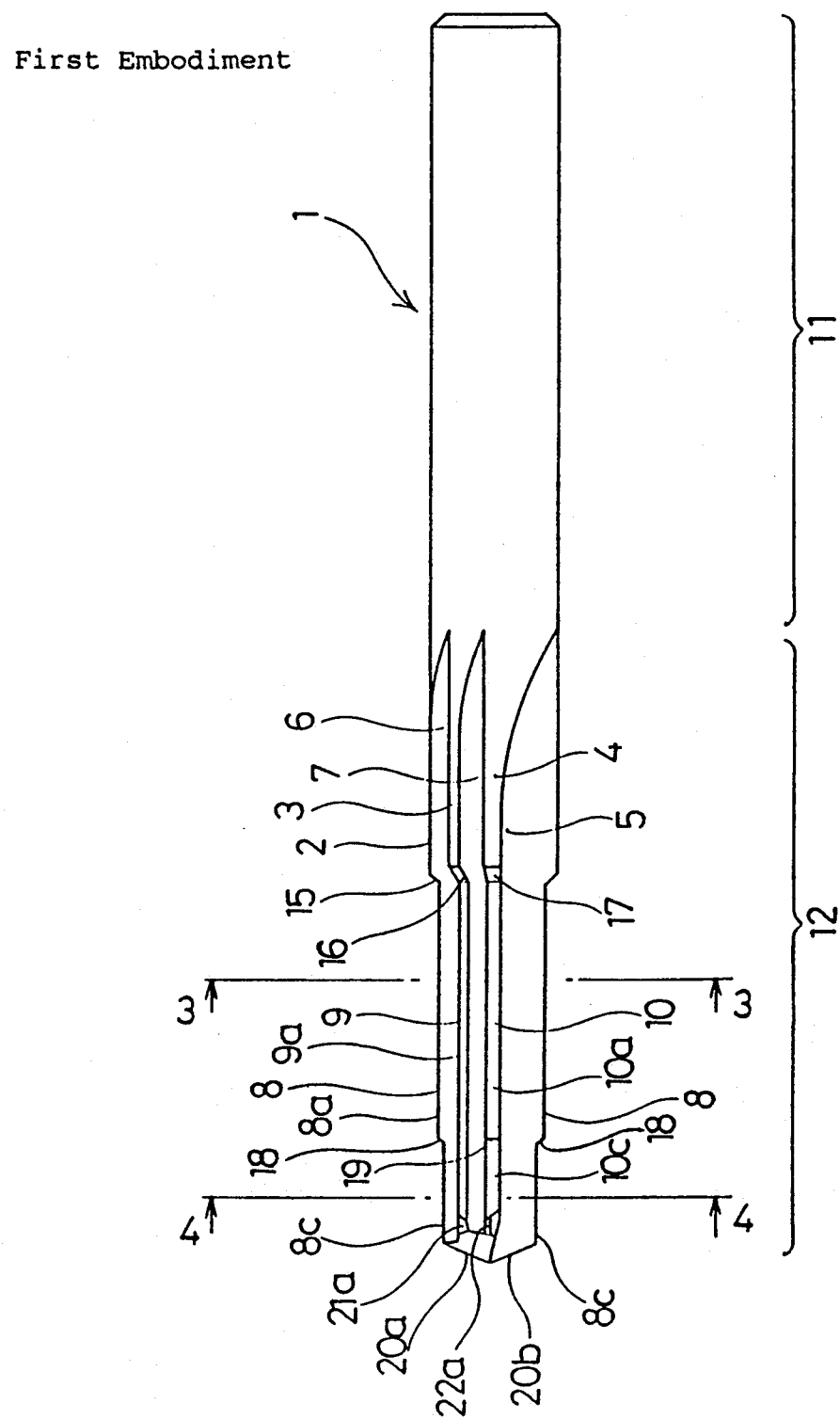
FIG. 1 is a side view illustrating a first embodiment of the invention.

As illustrated in FIG. 1, the burnishing drill 1 adapted to bore a hole in a workpiece made of a material such as cast iron comprises a cylindrical shank 11 made of hard metal and a drill body 12 integrally connected with the shank.

Figure 2:
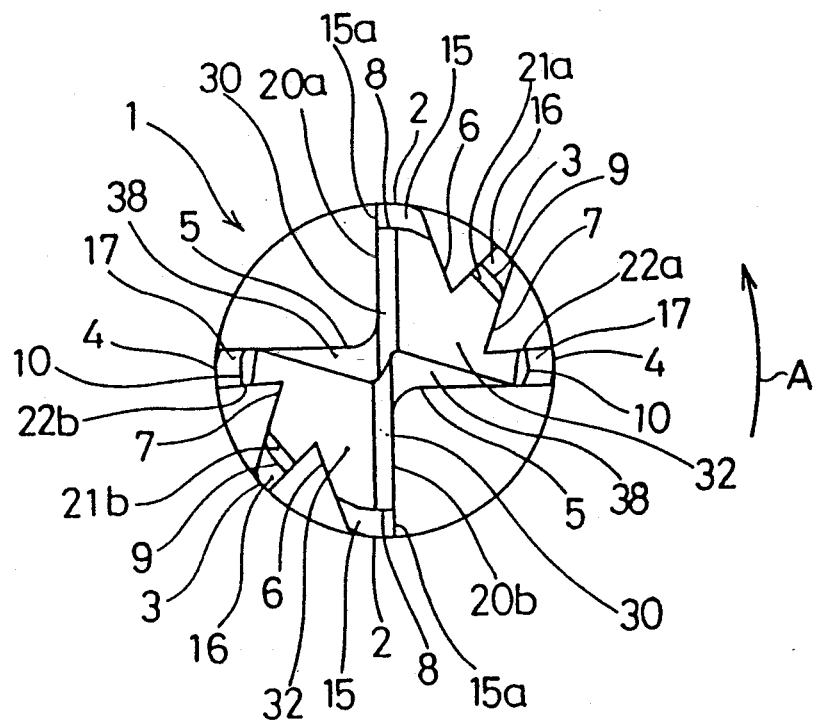
FIG. 2 is a front view illustrating the first embodiment of the invention.

As shown in FIGS. 1 and 2, the drill body 12 comprises a first pair of lands 2 axially extending toward the shank 11, a second pair of lands 3 which are offset relative to the first pair of lands 2 by 45° in the direction opposite to the rotational direction shown by arrow A in FIG. 2, and a third pair of lands 4 which are offset relative to the second pair of lands 3 by 45° in the direction opposite to the rotational direction shown by arrow A in FIG. 2. There are relief grooves 5, 6 and 7 provided between the lands 2, the lands 3 and the lands 4, which extend axially from the foremost end of the drill body 12 toward the shank 11. Chips are released outside a drilled hole through the relief grooves 5, 6 and 7.

Figure 3:
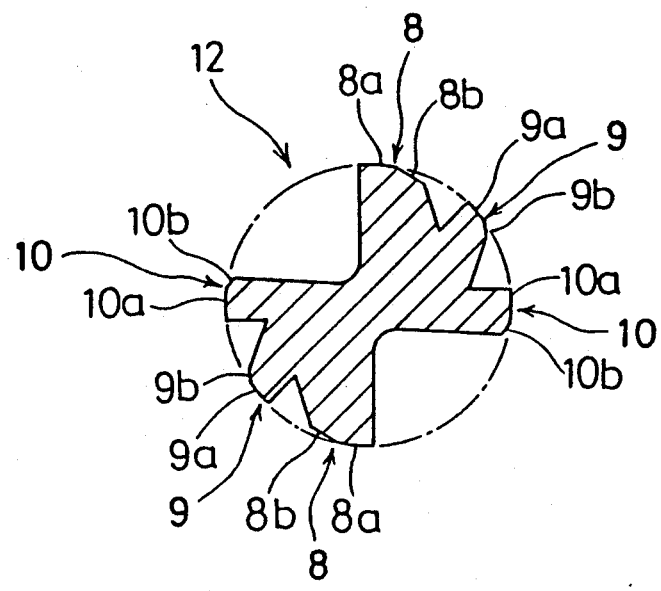
FIG. 3 is a sectional view of the burnishing drill taken on line 3—3 shown in FIG. 1.
Figure 4:
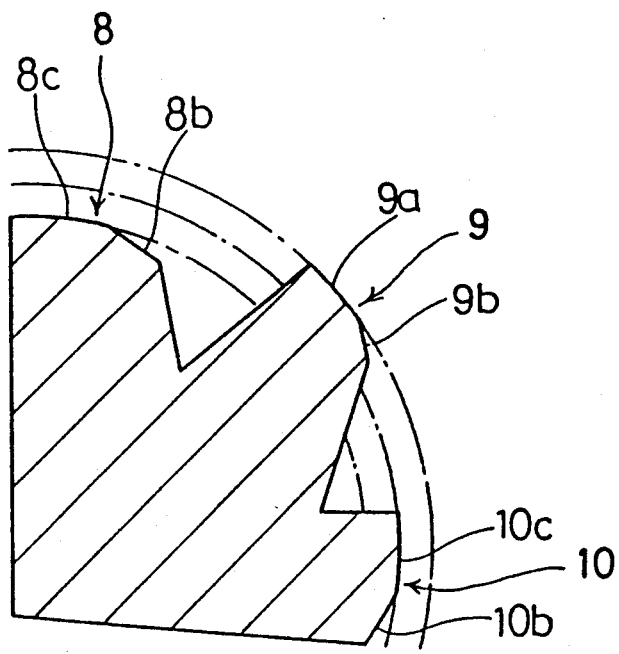
FIG. 4 is a sectional view of the burnishing drill taken on line 4—4 shown in FIG. 1.

A first reduced-diameter portion 8, a second reduced-diameter portion 9 and a third reduced-diameter portion 10, which have their external diameters smaller than that of the shank 11, extend from a step portion 15 of the first land 2, a step portion 16 of the second land 3 and a step portion 17 of the third land 4 toward the foremost end of the drill respectively. As illustrated in FIG. 3, the first reduced-diameter portion 8, the second reduced-diameter portion 9 and the third reduced-diameter portion 10 have circular faces 8a, 9a and 10a respectively, which have the same diameter as one another. Relief surfaces 8b, 9b and 10b are formed behind the first reduced-diameter portion 8, the second reduced-diameter portion 9 and the third reduced-diameter portion 10 respectively with respect to the rotational direction. The relief surfaces 8b, 9b and 10b have their relief angles formed such that the circular surfaces 8a, 9a and 10a are of the same length as one another. As shown in FIG. 1, reduced-diameter circular surfaces 8c and 10c extend from a step portion 18 of the circular surface 8a and a step portion 19 of the circular surface 10a toward the foremost end of the drill body 12 respectively. As shown in FIG. 4, the reduced-diameter circular surface 8c has its diameter smaller than the external diameter of the reduced-diameter circular surface 10c. There is no reduced-diameter circular surface formed at the foremost end of the circular surface 9a. Therefore, as shown in FIG. 4, the external diameter of the foremost end of the second reduced-diameter portion 9 is larger than that of the third reduced-diameter portion 10. And the external diameter of the foremost end of the third reduced-diameter portion 10 is larger than that of the first reduced-diameter 8.

From their respective reduced-diameter positions, step portions 15, 16 and 17 extend radially outward and incline axially in the rearward direction. The step portion 15 is formed at a position axially nearer to the foremost end of the drill than the step portions 16 and 17. As illustrated in FIG. 2, a pair of chamfering edges 15a are formed at forward positions of the step portion 15 with respect to the rotational direction of the drill to cut corners of an opening of a finished hole. Each of the chamfering edges 15a has a cutting angle of about 45° with respect to the drill axis. The step portions 16 and 17 extend axially toward the rearward end of the drill without chamfering edges.

As shown in FIG. 2, a pair of drilling edges 20a and 20b, a pair of reaming faces 21a and 21b, and a pair of reaming edges 22a and 22b are provided at the foremost ends of the first reduced-diameter portion 8, the second reduced-diameter portion 9 and the third reduced-diameter portion 10, respectively. Each of the outermost ends of the drilling edges 20a and 20b is connected to the reduced-diameter circular surface 8c of the first reduced-diameter portion 8. Each of the outermost ends of the reaming edges 22a and 22b is connected to the reduced-diameter circular surface 10c of the third reduced-diameter portion 10. Each of the outermost ends of the reaming faces 21a and 21b is connected to the circular surface 9a.

Figure 5:
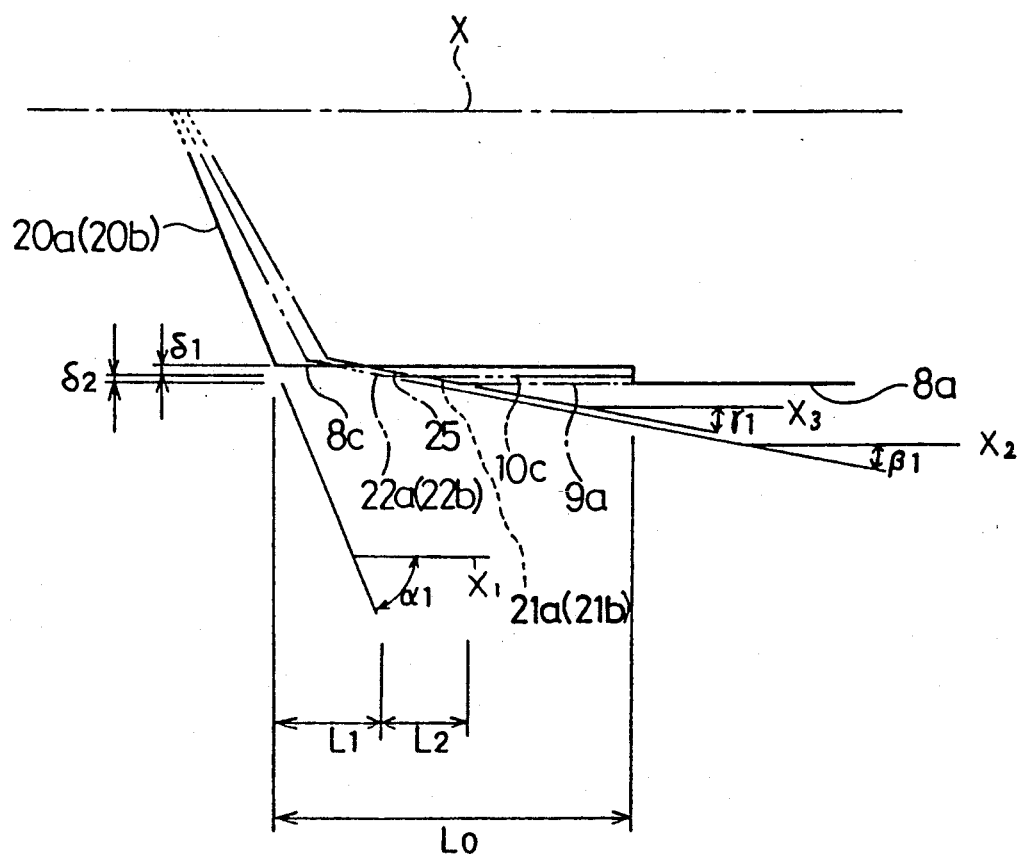
FIG. 5 is a schematic view illustrating the positions of the drilling edges, the reaming edges and the reaming faces of the first embodiment of the invention.

As shown in FIG. 5, each of the linear drilling edges 20a and 20b, which is disposed in a plane including the drill axis X, extends radially outward from the foremost end of the drill body 12 and inclines axially in the rearward direction with a cutting angle $\alpha_1$. The cutting angle $\alpha_1$ is set within a range of between 60° and 90° with respect to the drill axis. In FIG. 5, lines $X_1$, $X_2$ and $X_3$ are parallel to the drill axis X.

22a and 22b which

Each of the linear reaming edges 22a and 22b which is disposed in a space including the drill axis X and intersecting the drilling edges 20a and 20b is formed on a shoulder portion of the foremost end of the third reduced-diameter portion 10. The reaming edges 22a and 22b are offset relative to the drilling edges 20a and 20b by 75° to 95° in the direction opposite to the rotational direction. A cutting angle $\beta_1$ of the reaming edges 22a and 22b shown in FIG. 5 is set to a relatively small angle, for example 10° with respect to the drill axis X. The cutting angle $\beta_1$ can be set within the range of between 5° and 30°. If the cutting angle $\beta_1$ is smaller than 5°, it will be found that the reaming edges tend to become longer and have difficulty in forming a relatively shallow hole in a workpiece. If the cutting angle $\beta_1$ is larger than 30°, it will be found that the load per given length of the reaming edges becomes larger and this often results in a decrease in the centering property.

Figure 6:
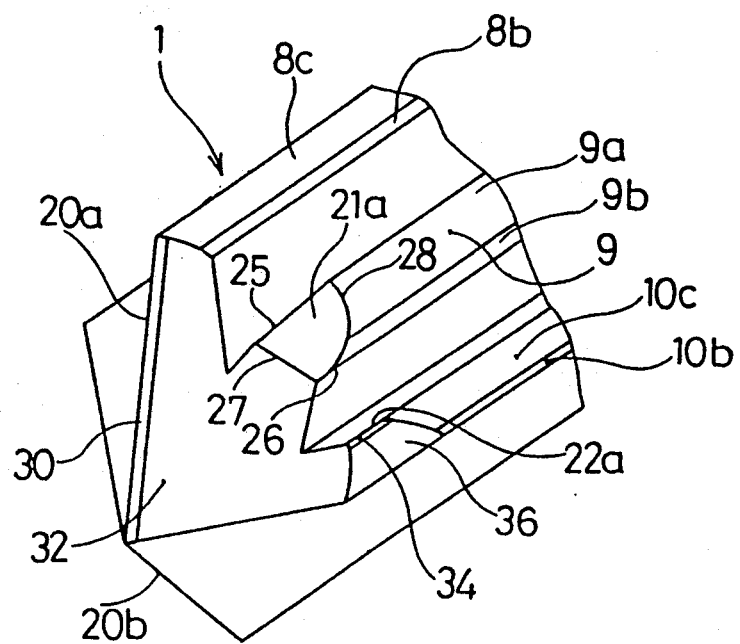
FIG. 6 is a partial perspective view illustrating the first embodiment of the invention.
Figure 7:
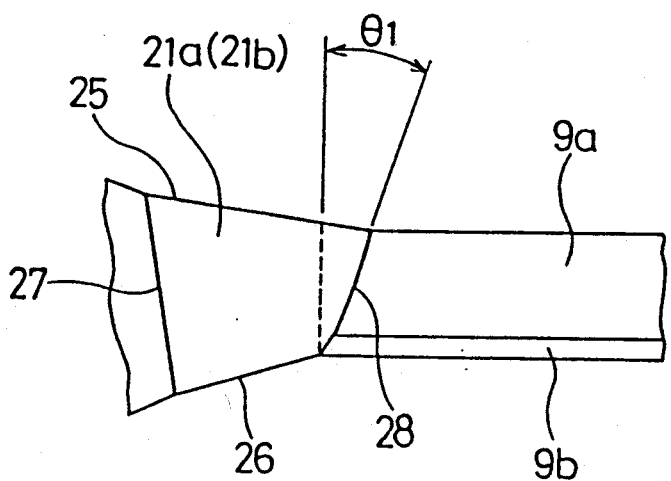
FIG. 7 is a partial enlarged view illustrating the first embodiment of the invention.

As illustrated in FIGS. 6 and 7, each of the plane reaming faces 21a and 21b formed on a shoulder portion of the foremost end of the second reduced-diameter portion 9 extends radially outward from the foremost end of the drill body 12 and inclines axially in the rearward direction, and also extends radially outward and inclines in the rearward direction with respect to the rotational direction to become more distant from the drill axis X. A forward outline 25 with respect to the rotational direction is disposed in a plane including the drill axis and intersecting the drilling edges 20a and 20b and the reaming edges 22a and 22b. As shown in FIG. 5, the inclined angle $\gamma_1$ of the outline 25 is set within the range of between 5° and 45°. A backward outline 26 with respect to the rotational direction is positioned radially outward from the outline 25. Therefore, the distance between the reaming faces and the drill axis X becomes larger at the outline 25 than at the outline 25.

A pair of curved outlines 28 are formed axially behind the reaming faces 21a and 21b. When the outline 28 is considered linear, the inclined angle $\theta_1$ of the outline 28 is set to about 10° with respect to the plane which is perpendicular to the drill axis X, as shown in FIG. 7.

The inclined angle $\phi_1$ can be set within the range of between 5° and 45° with respect to the drill axis X to prevent too much burden from being applied to the reaming faces 21a and 21b while the drill is rotated. In addition, the outline 28 which is formed at a border portion between the reaming faces 21a and 21b and the circular face 9a can be a curved line to improve the surface roughness of the finished hole.

As shown in FIG. 5, the outermost ends of the reaming edges 22a and 22b are provided axially behind the outermost ends of the drilling edges 20a and 20b by a distance $L_1$. And, the outermost ends of the outlines 25 are provided axially behind the outermost ends of the reaming edges 22a and 22b by a distance $L_2$. Therefore, when the burnishing drill is rotated, the drilling edges 20a and 20b reach a workpiece earlier than the reaming edges 22a and 22b. And, the reaming edges 22a and 22b reach the workpiece earlier than the reaming faces 21a and 21b.

As also shown in FIG. 5, the outermost ends of the reaming edges 22a and 22b extend radially outward from the positions of the outermost ends of the drilling edges 20a and 20b by a distance $\delta_1$. And the outermost ends of the outlines 25 extend radially outward from the positions of the outermost ends of the reaming edges 22a and 22b by a distance $\delta_2$. Therefore, when the drilling edges 20a and 20b operate to drill a hole in a workpiece, the reaming edges 22a and 22b stabilize the diameter of the drilled hole and the reaming faces 21a and 21b improve the surface roughness of the inner hole.

When making a burnishing drill which has a reduced-diameter circular surface 8c of about 10 mm, it is recommended that the distance $L_1$ be set at about 1.8 mm and the distance $L_2$ be set at about 0.7 mm. When making a burnishing drill which has an external diameter of the circular surface 8a of about 10 mm, it is recommended that the distance $\delta_1$ be set at about 0.08 mm and the distance $\delta_2$ be set at about 0.2 mm. The distance $\delta_1$ can be set within the range of between 0.06 mm and 0.16 mm, and the distance $\delta_2$ can be set within the range of between 0.005 mm and 0.04 mm.

As shown in FIG. 2, a first relief surface 30 and a second relief surface 32 are formed behind the drilling edges 20a and 20b respectively with respect to the rotational direction. The relief surfaces 30 and 32 extend radially outward and incline toward the shank 11. And as illustrated in FIG. 6, a third relief surface 34 and a fourth relief surface 36 are formed behind the reaming edges 22a and 22b respectively with respect to the rotational direction. The relief surfaces 34 and 36 extend radially outward and incline toward the shank 11. As illustrated in FIG. 2, a relief portion 38 is formed in the root of each of the drilling edges 20a and 20b, which root is located at a position nearer to the shank 11 than the forward center of the drilling edges 20a and 20b. A relief groove 5 extends axially from the relief portion 38 toward the shank 11.

When the burnishing drill 1 is rotated in the direction of arrow A shown in FIG. 2 and is moved axially forward at a predetermined speed, a workpiece is first drilled by the drilling edges 20a and 20b. The drilled hole is then worked by the reaming edges 22a and 22b to reduce the amount of oversize of diameter. Further, the inner surface of the hole is burnished by the reaming faces 21a and 21b to provide a reamed hole having a smoother inner wall. After the finished hole is chamfered by the chamfering edges 15a, the burnishing drill 1 is returned axially backward.

Since the burnishing drill 1 has the reaming faces which smooth the inner surface of the drilled hole, it can provide accurately finished holes by greatly improving accuracy in diameter, surface roughness and circularity of the finished holes. In addition, since the reaming edges 22a and 22b and the reaming faces 21a and 21b need very little machining, relatively little work is applied while cutting. Therefore, the burnishing drill 1 can improve the centering and stabilizing properties. And, drilling and reaming can be performed during only one process to reduce the workhours and enhance the production efficiency.

Figure 8:
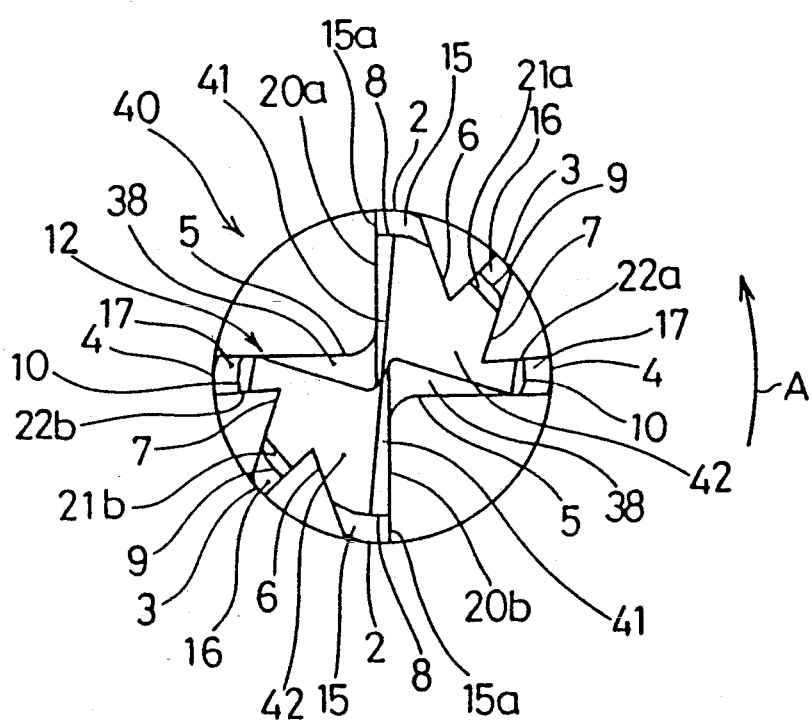
FIG. 8 is a front view illustrating a second embodiment of the invention.

The second embodiment of the invention is illustrated in FIG. 8.

A burnishing drill 40 includes a first pair of relief surfaces 41 which are connected to the drilling edges 20a and 20b. Each of the relief surfaces 41 extends radially outward from the foremost end of the drill body 12 and becomes wider at the outermost end. The roots of the first relief surfaces 41 are narrower in width than their outermost ends. Accordingly, a second pair of relief surfaces 42 have relatively large relief areas at the foremost ends. According to the second embodiment of the invention, the first relief surfaces 41 can strengthen the drilling edges 20a and 20b. And, the second relief surfaces 42 can easily release chips out of the roots of the edges. This results in the improved biting of the drilling edges 20a and 20b. It is noted that other parts are substantially similar to those described in connection with the first embodiment. Accordingly, they are indicated by the same reference numerals and are not further explained in relation to the second embodiment.

Figure 9:
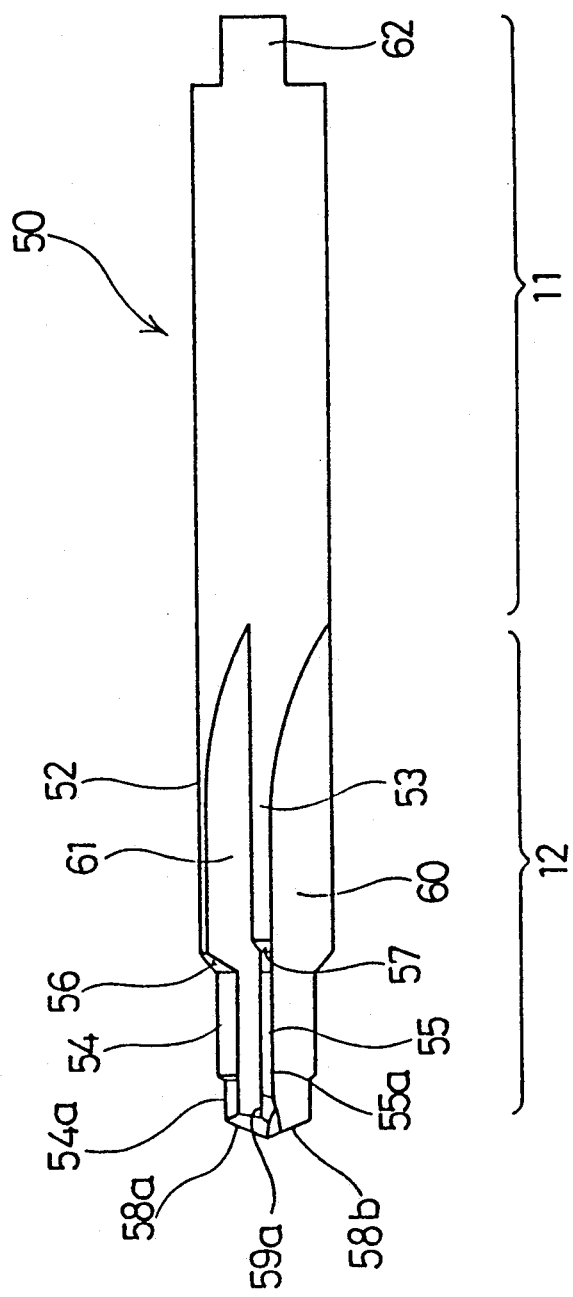
FIG. 9 is a side view illustrating a third embodiment of the invention.
Figure 10:
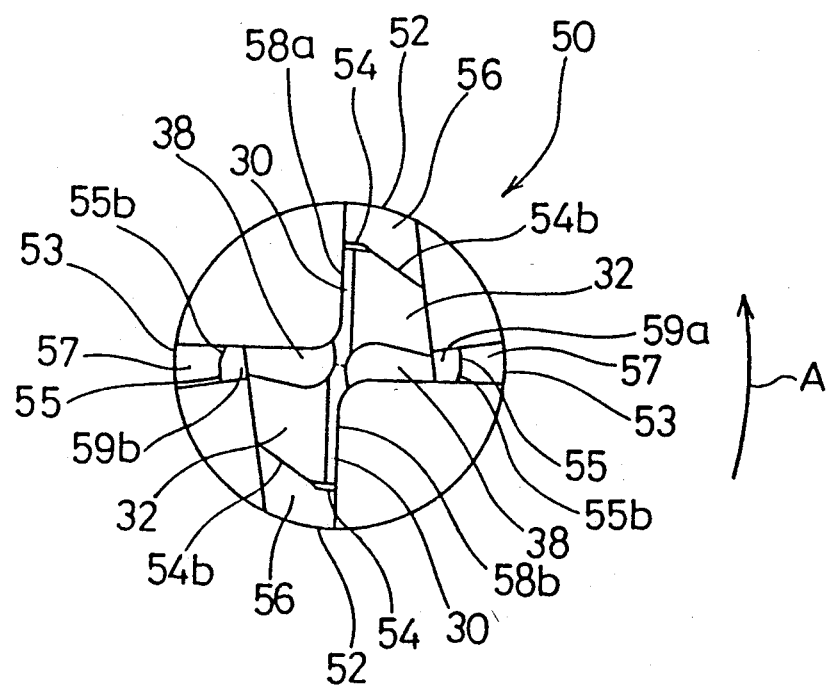
FIG. 10 is a front view illustrating the third embodiment of the invention.
Figure 11:
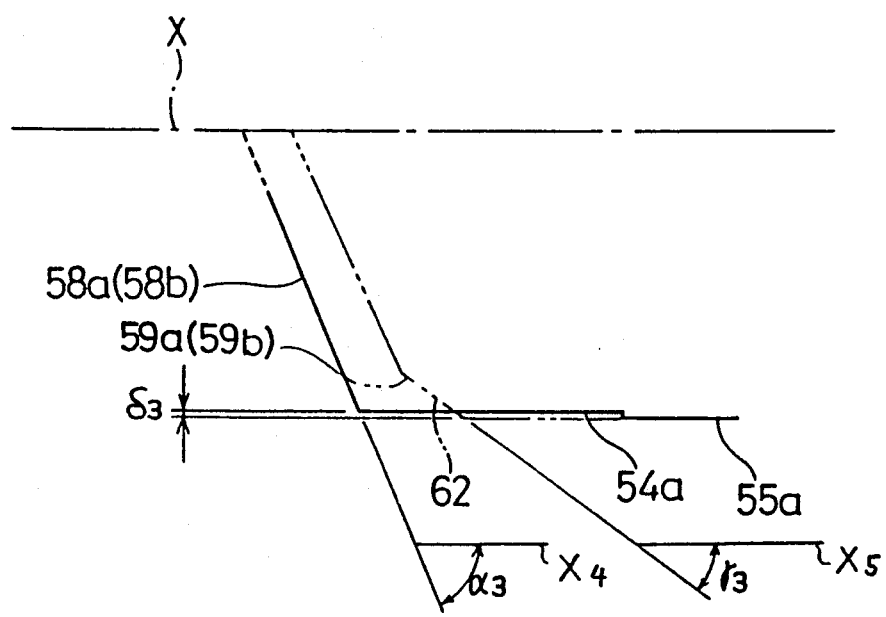
FIG. 11 is a schematic view illustrating the positions of the drilling edges and the reaming faces of the third embodiment of the invention.

The third embodiment of the invention is illustrated in FIGS. 9 to 11.

A burnishing drill 50 comprises a pair of drilling edges 58a and 58b and a pair of reaming faces 59a and 59b. Each of the drilling edges 58a and 58b is formed on a foremost end of a first reduced-diameter portion 54 extending from a step portion 56 of a first pair of lands 52. Each of the reaming faces 59a and 59b is formed on a foremost end of a second reduced-diameter portion 55 extending from a step portion 57 of a second pair of lands 53. The burnishing drill of the third embodiment includes no reaming edges. Therefore, a cutting process by reaming edges, which is included in the first and second embodiments, is not included in the third embodiment. The second pair of lands 53 are offset relative to the first pair of lands 52 by 90° rearwardly in the direction opposite to the rotational direction. There are provided relief grooves 60 and 61 between the first pair of lands 52 and the second pair of lands 53, which extend axially from the foremost end of the drill body. A tongue portion 62 extends axially at a backward position of the shank 11. As illustrated in FIG. 9, each of the outermost ends of the drilling edges 58a and 58b and each of the outermost ends of the reaming faces 59a and 59b are connected to a reduced-diameter circular surface 54a and a circular surface 55a respectively. As shown in FIG. 10, relief surfaces 54b and 55b are formed at positions behind the reduced-diameter circular surface 54a and the circular surface 55a respectively with respect to the rotational direction.

As illustrated in FIG. 11, the outermost ends of the forward outlines of the reaming faces 59a and 59b with respect to the rotational direction extend radially outward from positions of the outermost ends of the drilling edges 58a and 58b by a distance $\delta_3$, and axially behind them by a distance of $L_3$. An inclined angle $\gamma_3$ of the outlines 62 is set to about 10°. A cutting angle $\alpha_3$ of the drilling edges 58a and 58b is set to about 67.5°. In FIG. 11, lines $X_4$ and $X_5$ are parallel to the drill axis X.

When the burnishing drill 50 is rotated, a workpiece is drilled by the drilling edges 58a and 58b. The drilled hole is then finished by the reaming faces 59a and 59b. This process can reduce the amount of the oversize of the diameter and improve the accuracy of the size of the finished holes. Since the third embodiment has a relatively simple drill shape, the external diameter of the drill can be small. Therefore, it is effective to use the drill for forming a hole having a relatively small diameter.

Figure 12:
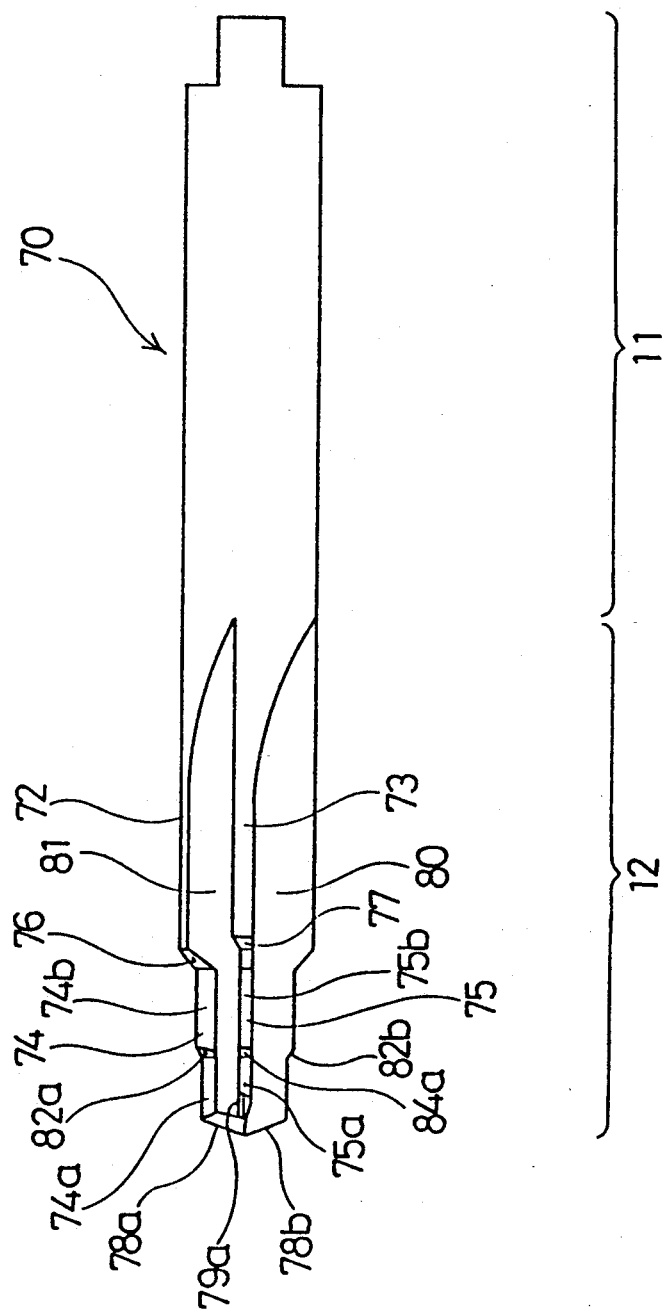
FIG. 12 is a side view illustrating a fourth embodiment of the invention.
Figure 13:
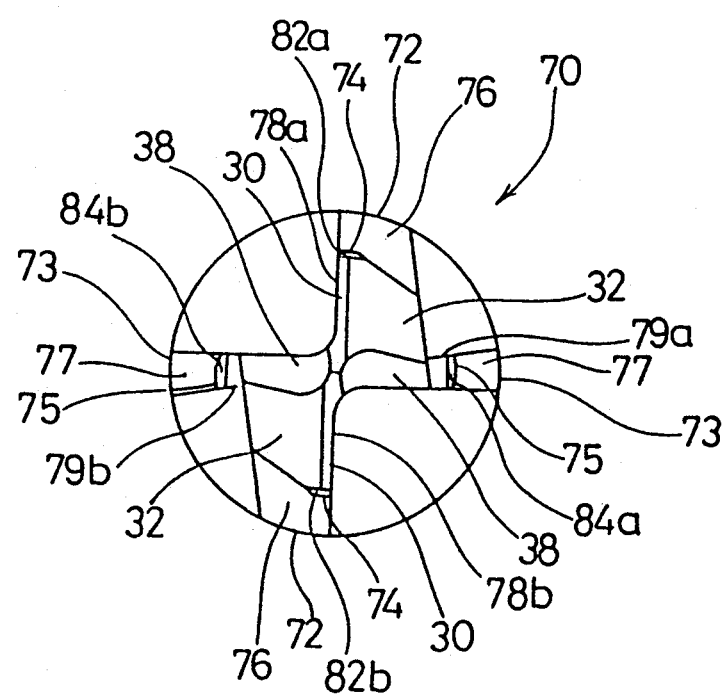
FIG. 13 is a front view illustrating the fourth embodiment of the invention.
Figure 14:
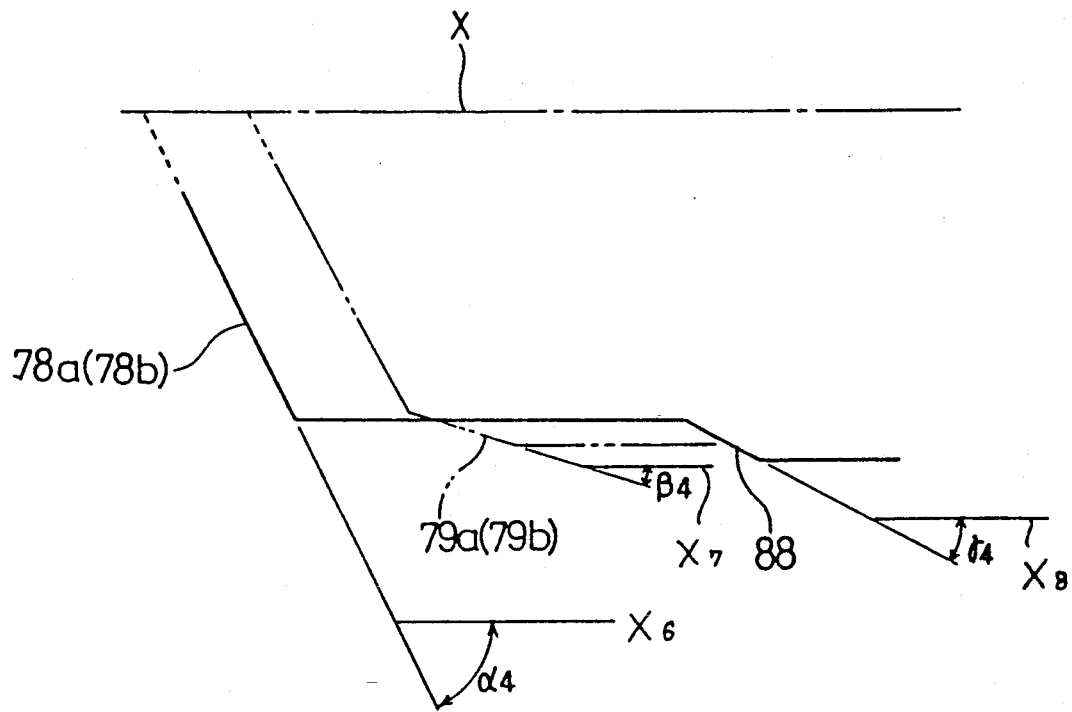
FIG. 14 is a schematic view illustrating the positions of the drilling edges, the reaming edges and the reaming faces of the fourth embodiment of the invention.
Figure 15:
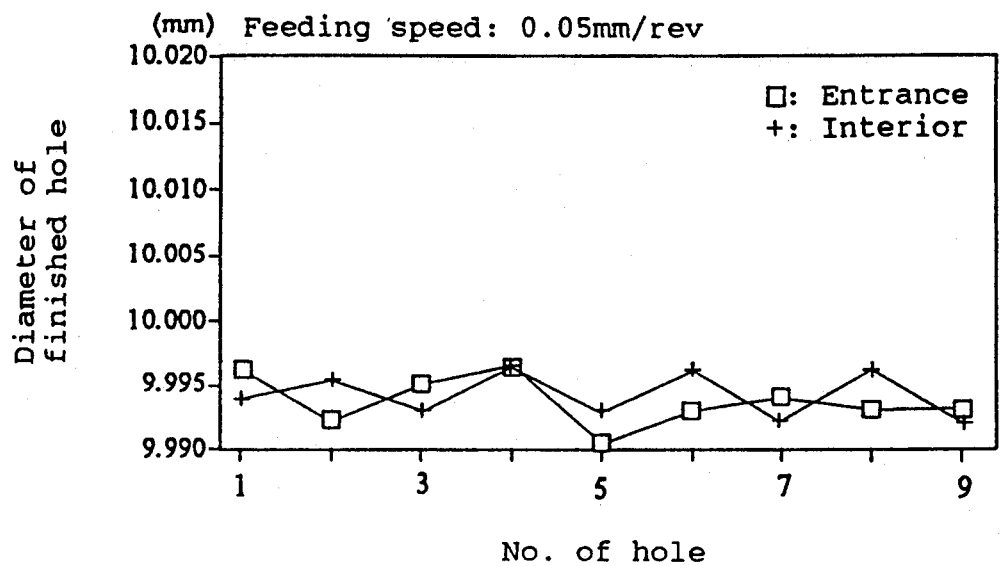
FIG. 15 is a characteristic diagram showing dispersion of diameter of the holes drilled and reamed by the burnishing drill of the first embodiment of the invention.
Figure 16:
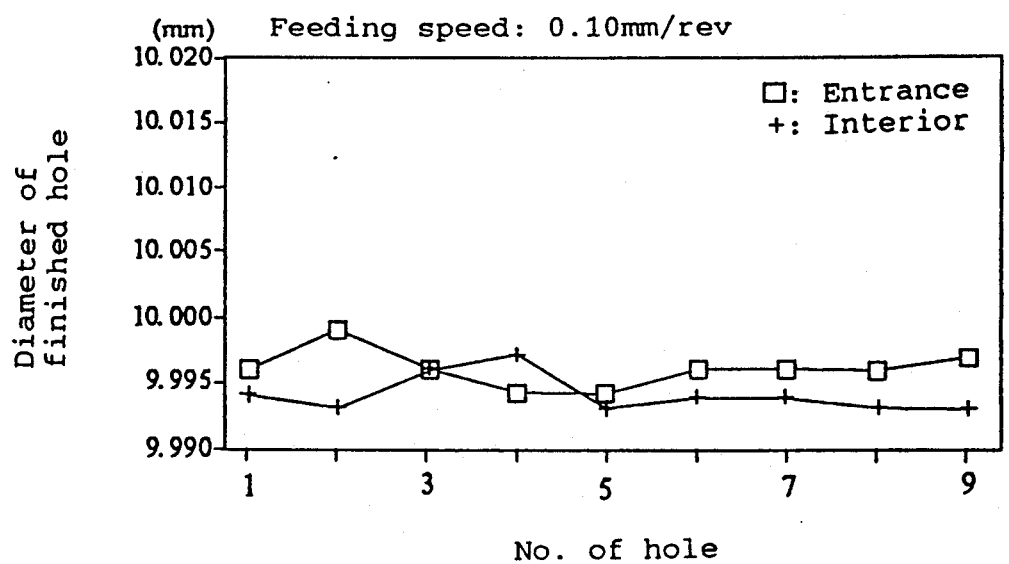
FIG. 16 is a characteristic diagram showing dispersion of diameter of the holes drilled and reamed by the burnishing drill of the first embodiment of the invention.
Figure 17:
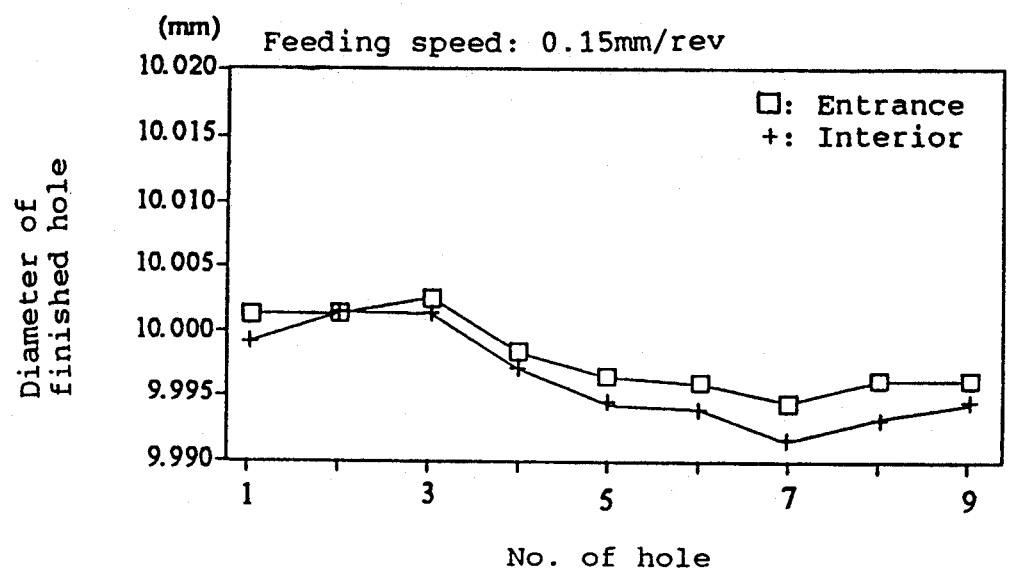
FIG. 17 is a characteristic diagram showing dispersion of diameter of the holes drilled and reamed by the burnishing drill of the first embodiment of the invention.
Figure 18:
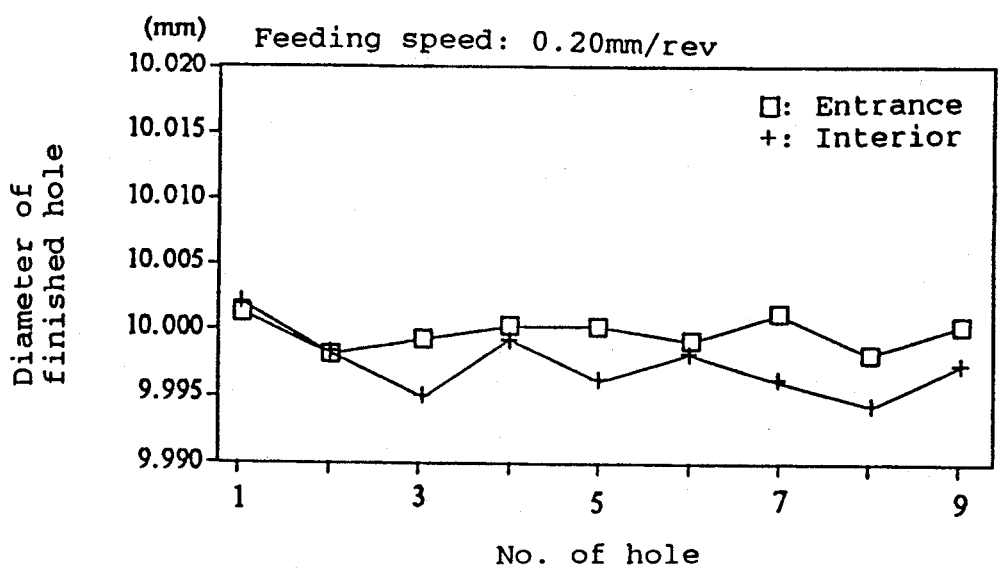
FIG. 18 is a characteristic diagram showing dispersion of diameter of the holes drilled and reamed by the burnishing drill of the first embodiment of the invention.
Figure 19:
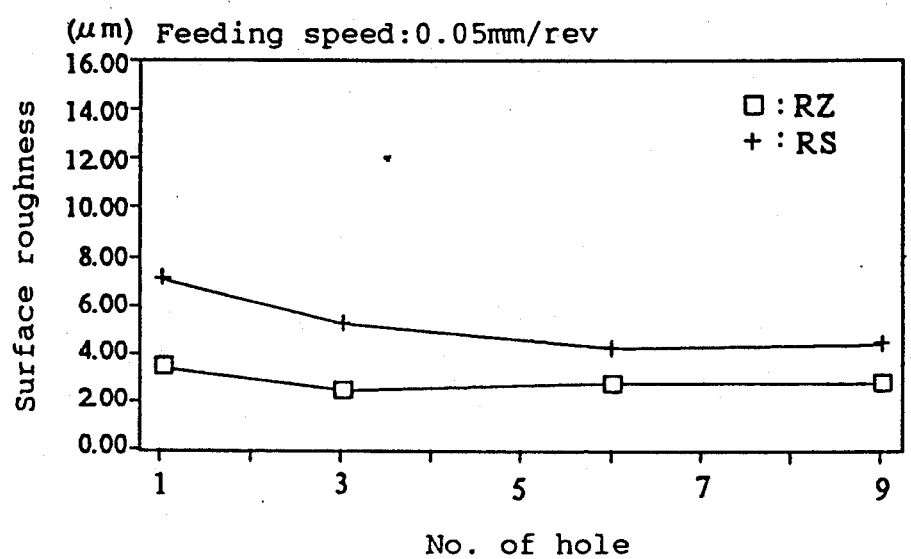
FIG. 19 is a characteristic diagram showing dispersion of surface roughness of the holes drilled and reamed by the burnishing drill of the first embodiment of the invention.
Figure 20:
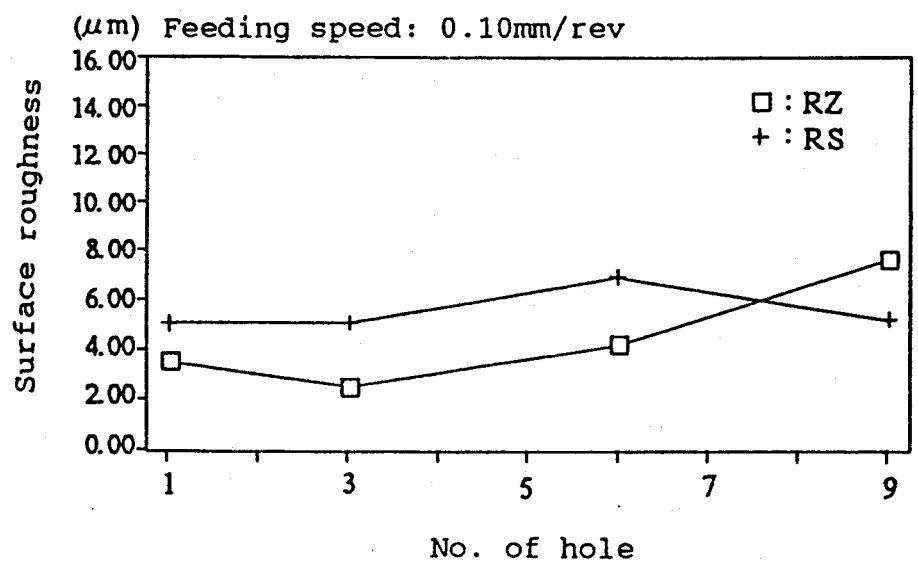
FIG. 20 is a characteristic diagram showing dispersion of surface roughness of the holes drilled and reamed by the burnishing drill of the first embodiment of the invention.
Figure 21:
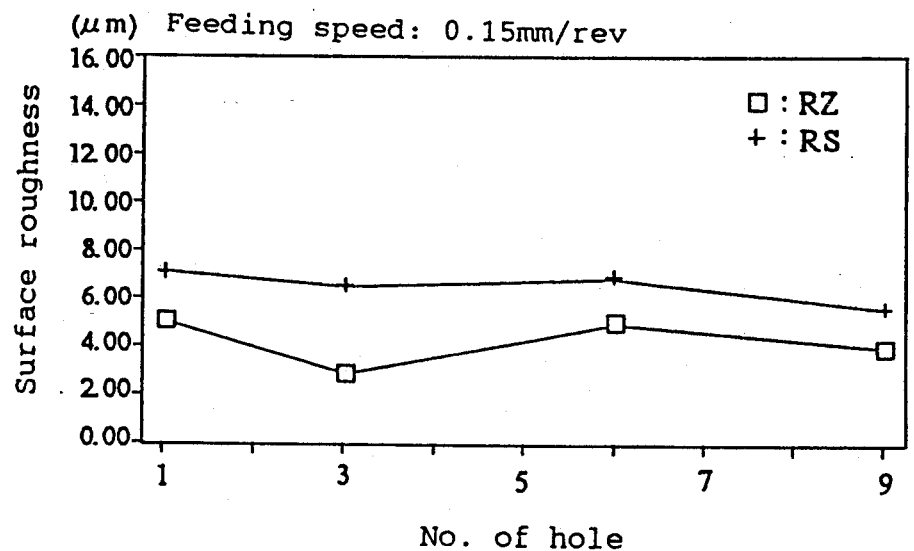
FIG. 21 is a characteristic diagram showing dispersion of surface roughness of the holes drilled and reamed by the burnishing drill of the first embodiment of the invention.
Figure 22:
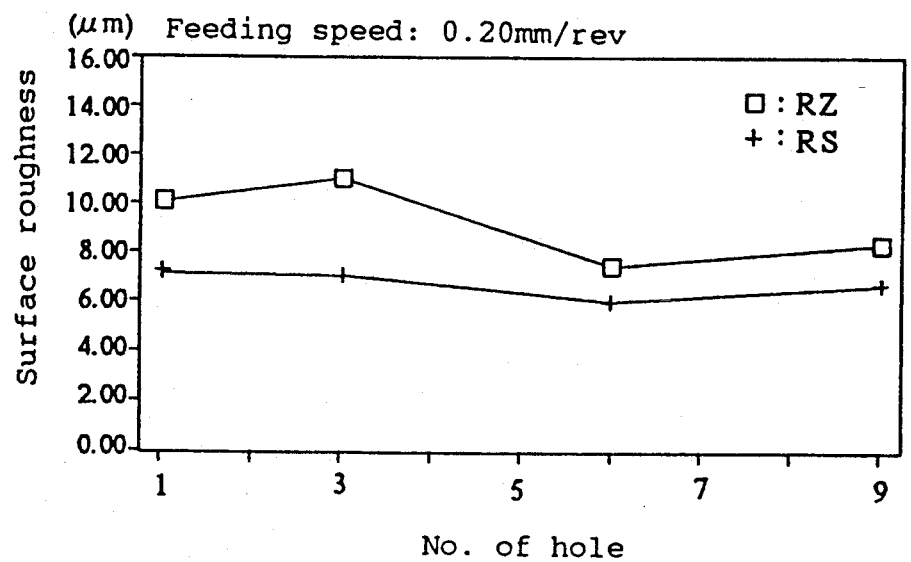
FIG. 22 is a characteristic diagram showing dispersion of surface roughness of the holes drilled and reamed by the burnishing drill of the first embodiment of the invention.
Figure 23:
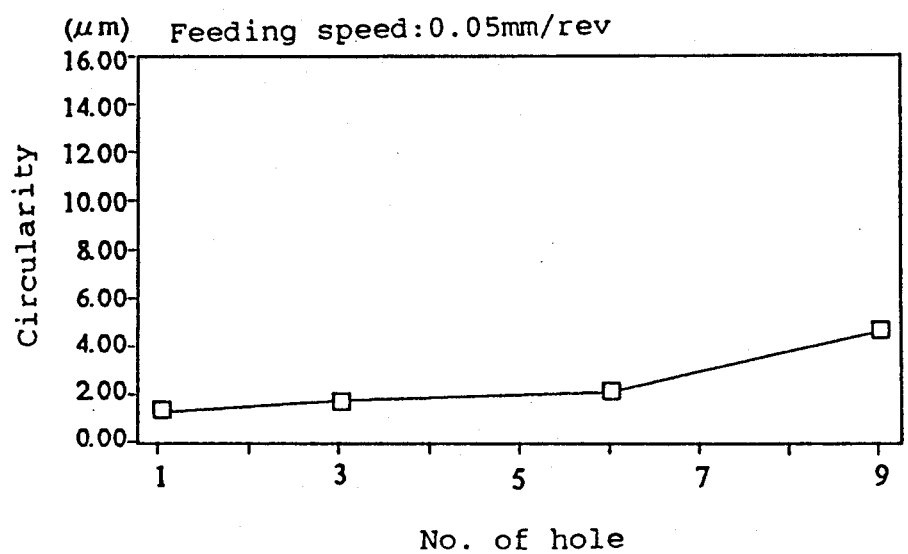
FIG. 23 is a characteristic diagram showing dispersion of circularity of the holes drilled and reamed by the burnishing drill of the first embodiment of the invention.
Figure 24:
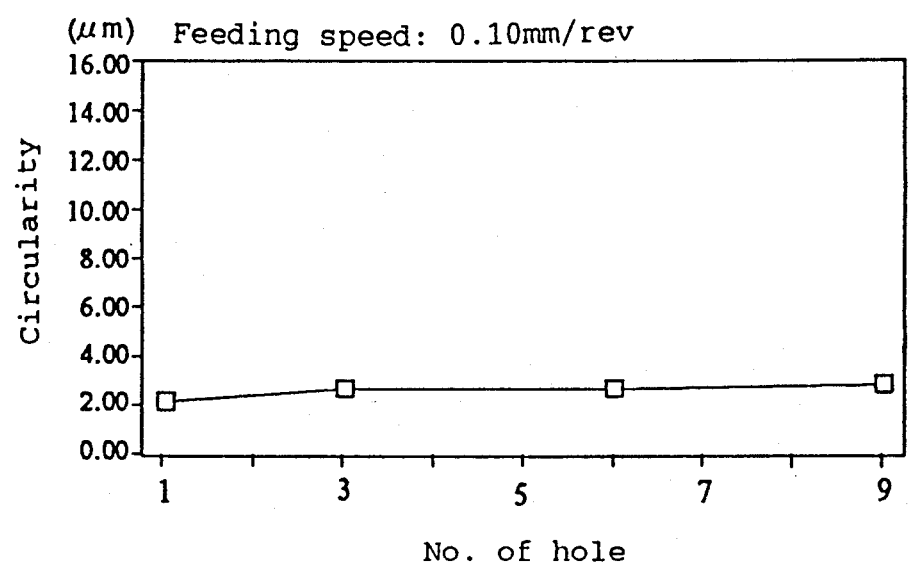
FIG. 24 is a characteristic diagram showing dispersion of circularity of the holes drilled and reamed by the burnishing drill of the first embodiment of the invention.
Figure 25:
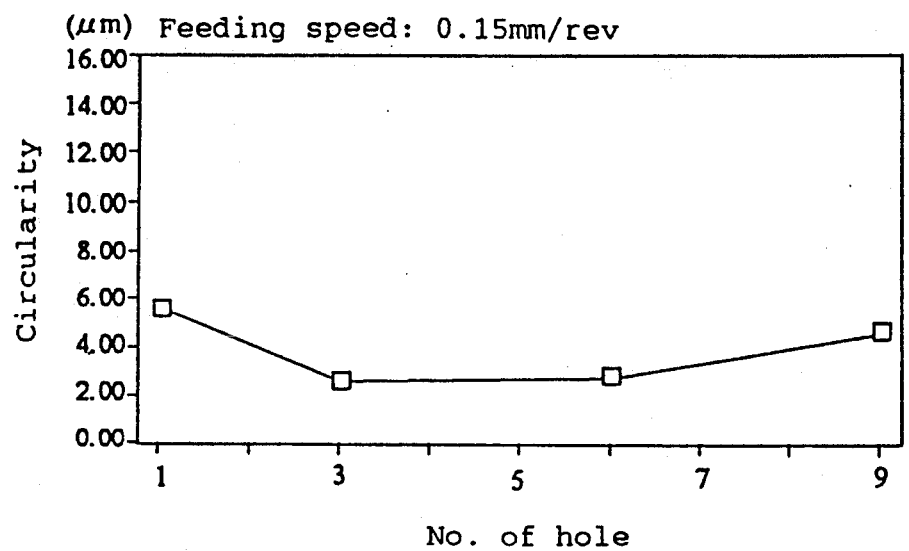
FIG. 25 is a characteristic diagram showing dispersion of circularity of the holes drilled and reamed by the burnishing drill of the first embodiment of the invention.
Figure 26:
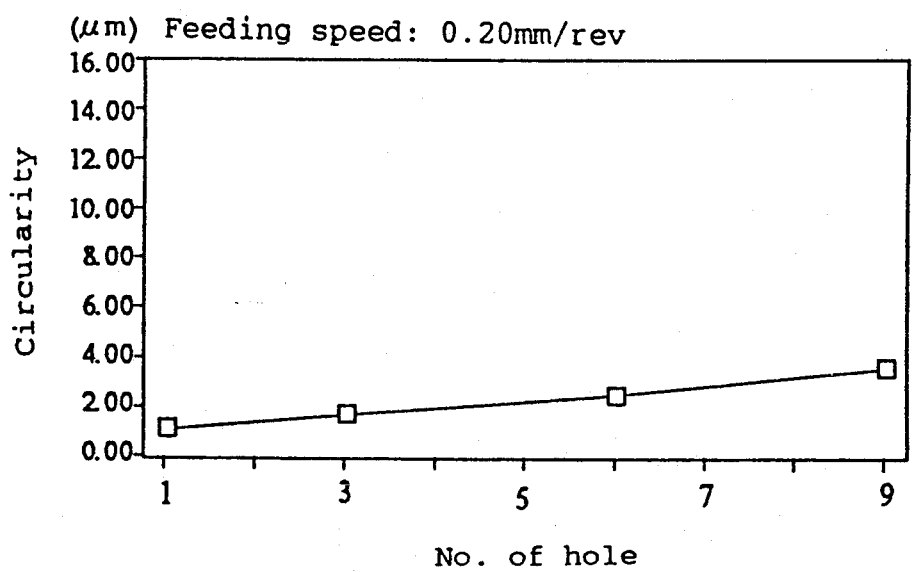
FIG. 26 is a characteristic diagram showing dispersion of circularity of the holes drilled and reamed by the burnishing drill of the first embodiment of the invention.

The fourth embodiment of the invention is illustrated in FIGS. 12 to 14.

According to the fourth embodiment, a pair of drilling edges 78a and 78b and a pair of reaming edges 79a and 79b are formed on the foremost end of the drill body 12, and reaming faces 82a, 82b, 84a and 84b are formed axially at backward positions of the drill body 12 by a predetermined distance.

Each of the drilling edges 78a and 78b is formed on a foremost end of a first reduced-diameter portion 74 extending from a step portion 76 of a first pair of lands 72, and each of the reaming edges 79a and 79b is formed on a foremost end of a second reduced-diameter portion 75 extending from a step portion 77 of a second pair of lands 73. The second reduced-diameter portion 75 is offset relative to the first reduced-diameter portion 74 by 90° rearwardly in the direction opposite to the rotational direction. There are provided relief grooves 80 and 81 between the first reduced-diameter portion 74 and the second reduced-diameter portion 75, which extend axially from the foremost end of the drill body. Each of the outermost ends of the drilling edges 78a and 78b and each of the outermost ends of the reaming edges 79a and 79b are connected to a first reduced-diameter circular surface 74a of the first reduced-diameter portion 74 and a reduced-diameter circular surface 75b of the second reduced-diameter portion 75 respectively. The reaming faces 82a, 82b, 84a and 84b are provided on the step portions which connect the reduced-diameter circular surfaces 74a and 75a with enlarged-diameter circular surfaces 74b and 75b.

The reaming faces 82a, 82b, 84a and 84b extend radially outward and incline axially in the rearward direction, and also extend radially outward and incline in the rearward direction with respect to the rotational direction. In order to form the reaming faces 82a, 82b, 84a and 84b more easily, the axial length of the reduced-diameter circular surface 74a and 75a is set relatively long.

As shown in FIG. 14, the drilling edges 78a and 78b have a cutting angle $\alpha_4$ and the reaming edges 79a and 79b have a cutting angle $\beta_4$. The forward outlines 88 of the reaming faces 82a, 82b, 84a and 84b with respect to the rotational direction have an inclined angle $\gamma_4$. The outermost ends of the outlines 88 extend outward from the outermost ends of the drilling edges 78a and 78b and the reaming edges 79a and 79b. The reaming faces 82a, 82b, 84a and 84b are formed axially at the same position as one another. In FIG. 14, lines $X_6$, $X_7$ and $X_8$ are parallel to the drill axis X.

Since the fourth embodiment has a relatively simple drill shape, it is effective to use the drill for forming a hole of relatively small diameter. In addition, since the reaming faces 82a, 82b, 84a and 84b can finish the inner surface of the drilled hole more smoothly, the surface roughness of the finished hole can be much improved.

FIGS. 15 to 26 show the results of experimentation carried out to study the diameter, surface roughness and circularity of the holes drilled and reamed by the burnishing drill of the first embodiment. The conditions for the experiments are as follows:

Tool diameter: 10.001 mm
Rotating speed: 955 rpm
Cutting speed: 30 m/min.
Feeding speed: 0.05, 0.10, 0.15, 0.20 mm/rev.

As understood from FIGS. 15 to 18, the diameters of the finished holes were relatively small in dispersion, even when the feeding speed was relatively high. The difference among the diameters of the finished holes was very little.

As also understood from FIGS. 19 to 22, the surface roughness of the finished holes was small in dispersion.

In addition, as shown in FIGS. 23 to 26, the circularity of the finished holes was also small in dispersion.

As explained above, since the burnishing drill of the invention includes the drilling edges which drill a hole, and the reaming faces which smooth the inner surface of the drilled hole, the centering and stabilizing properties can be much improved and a hole can be formed in a reduced period, with increased accuracy.

We claim:

1. A burnishing drill, comprising:
an elongated shank having a longitudinal axis and two axially opposite ends;
an elongated drill body having a longitudinal axis and two axially opposite ends;
said drill body being connected at a trailing said end thereof to said elongated shank at a leading said end thereof;
said drill body having a forward portion thereof with a generally arcuate external sidewall surface which intersects said leading end thereof;
said drill body being arranged to be rotated about said longitudinal axis thereof in a rotational direction, by rotation of said elongated shank about said longitudinal axis thereof;
a leading said end of said drill body having outer peripheral edges;
surfaces defining a pair of drilling edges on said drill body at said leading end thereof, said drilling edges being generally diametrically opposed to one another but with some lateral offset from one another in opposite directions along an imaginary line perpendicular thereto and to said longitudinal axis of said drill body and extending substantially parallel to a diameter of said drill body, at least one of said surfaces defining each of said drill edges further defining, at least in part, a first axial groove in said sidewall surface which intersects said leading end of said drill body;

each said drilling edge being substantially linear and oriented at a predetermined acute cutting angle $\alpha$ with respect to said longitudinal axis of said drill body, such that each said drilling edge slants axially rearward toward said shank as it extends radially outwards towards one of said outer peripheral edges of said drill body;

a pair of reaming faces at generally diametrically opposed locations on said leading end of said drill body;

said reaming faces, throughout respective radial extents thereof, being located axially rearward of all radially corresponding elements of said drilling edges, relative to said longitudinal axis of said drill body;

said reaming faces having a radially outermost portion thereof being of a greater radial distance from said longitudinal axis of said drill body than a radially outermost portion of said drilling edges;

said reaming faces each cooperating with a respective first adjacent surface to define a rotationally leading outline edge of said reaming faces, each said adjacent surface defining, at least in part, a second axial groove in said sidewall surface which intersects said leading end of said drill body;

each said leading outline edge extending at a predetermined acute angle $\gamma_1$ to said longitudinal axis of said drill body within a range of 5° to 45°;

said reaming faces each cooperating with a respective second adjacent surface to define, at least in part, a rotationally trailing outline edge of said reaming faces, each said second adjacent surface defining, at least in part, a third axial groove in said sidewall surface which intersects said leading edge of said drill body;

each said reaming face being canted so that, throughout respective axial extends thereof, points on the respective rotationally trailing outline edge are spaced further from said longitudinal axis of said drill body than respective corresponding points on the respective rotationally leading outline edge;

each said second adjacent surface cooperating with a respective third adjacent surface to define respective reaming edges, said reaming edges having a radially outermost portion thereof being at a radially greater distance from said longitudinal axis of said body than said radially outermost portion of said drilling edges;

said reaming edges being oriented at respective predetermined acute cutting angles $\beta_1$ to said longitudinal axis of said drill body within a range of 5° to 30°, such that each said reaming edge extends radially outwards as it slants rearward toward said shank;

said reaming edges having said radially outermost portion thereof being at a lesser radial distance from said longitudinal axis of said body than said radially outermost portion of said reaming faces.

2. The burnishing drill as claimed in claim 1, further comprising second surfaces forming chamfering edges having a radially outermost portion thereof being at a greater radial distance from said longitudinal axis of said body than a radially outermost portion of said reaming faces.

3. The burnishing drill as claimed in claim 1, wherein the reaming faces each cooperate with said arcuate external sidewall surface to form respective arcuate edges.

4. The burnishing drill as claimed in claim 1, wherein said generally arcuate external sidewall surface comprises three pairs of diametrically opposed axially extending lands including a first pair of lands disposed between respective said first and second axial grooves, a second pair of lands disposed between respective said second and third axial grooves, and a third pair of lands disposed between respective said third and first axial grooves.

5. The burnishing drill as claimed in claim 4, wherein each of said first, second, and third pairs of lands have diameters perpendicular to said longitudinal axis of said drill body, and, at a forward portion of said drill body, said first pair of lands has a smaller diameter than said second and third pair of lands.

6. The burnishing drill as claimed in claim 5, wherein, at said forward portion of said drill body, said third pair of lands has a smaller diameter than said second pair of lands.

7. The burnishing drill as claimed in claim 6, wherein, at a middle portion of said drill body, said first, second and third pair of lands are all of equal diameter.

8. The burnishing drill as claimed in claim 7, wherein a step portion is disposed between said forward and middle portions of said drill body.

9. The burnishing drill as claimed in claim 8, wherein the diameters of said first, second and third pair of lands at said middle portion of said drill body are each greater than the diameter of said first pair of lands at said forward portion of said drill body.

10. The burnishing drill as claimed in claim 9, wherein, at a rearward portion of said drill body, said first, second, and third pair of lands are all of equal diameter.

11. The burnishing drill as claimed in claim 10, wherein said first, second and third pair of lands are of a greater diameter at said rearward portion of said drill body than at said middle portion of said drill body.

12. The burnishing drill as claimed in claim 11, wherein said first, second and third pairs of lands are provided with respective second step portions between said middle and rearward portions of said drill body.

13. The burnishing drill as claimed in claim 12, wherein said respective second step portions of said first pair of lands is disposed axially nearer to the leading end of said drill body than the respective second step portions of said second and third pair of lands.

14. The burnishing drill as claimed in claim 13, wherein said respective second step portions of said first pair of lands are each bordered by a chamfering edge.

15. The burnishing drill as claimed in claim 14, wherein each of said chamfering edges are oriented at a cutting angle of about 45° with respect to said longitudinal axis of said drill body.

16. The burnishing drill as claimed in claim 1, wherein the predetermined acute cutting angle $\alpha$ of each of said drilling edges is within the range of 60° to 90° with respect to said longitudinal axis of said drill body.

17. The burnishing drill as claimed in claim 1, wherein said reaming edges rotationally trail said drilling edges by a predetermined rotational angle within the range of 75° to 95°.

18. The burnishing drill as claimed in claim 1, wherein each said third adjacent surface cooperating with said respective second adjacent surface to form each said reaming edge comprises a rotationally trailing relief surface.

* * * * *